Nov. 24, 1953         F. E. PRINGLE, JR         2,660,054

ULTRASONIC THICKNESS MEASURING DEVICE

Filed Dec. 7, 1951

INVENTOR.
FRANK E. PRINGLE JR.
BY Joseph H. Lipschutz
ATTORNEY

Patented Nov. 24, 1953

2,660,054

UNITED STATES PATENT OFFICE 2,660,054

ULTRASONIC THICKNESS MEASURING DEVICE

Frank E. Pringle, Jr., La Grange, Ill., assignor to Sperry Products, Inc., Danbury, Conn., a corporation of New York Application December 7, 1951, Serial No. 260,465

3 Claims. (Cl. 73—67)

This invention relates to a means for measuring the thickness of objects by means of ultrasonic vibration waves. Heretofore thickness measurement has been proposed by transmitting ultrasonic waves of varying frequency into the object through one side thereof in order to establish resonance when a frequency whose wavelength equalled twice the thickness was reached. This method however required means for periodically generating a range of ultrasonic frequencies, and, furthermore, the actual thickness of the object was found to deviate from the theoretical thickness as determined by the resonant frequency.

It is therefore the principal object of this invention to provide an ultrasonic thickness measuring device which operates on a single frequency and is therefore less complicated than the device heretofore proposed and not subject to the deviation between theoretical and actual values.

It is a further object of this invention to provide a device of the type described in which the thickness of the object may be indicated directly without the necessity of calculation.

Further objects and advantages of this invention will become apparent in the following detailed description thereof.

In the accompanying drawings.

Figure 1:
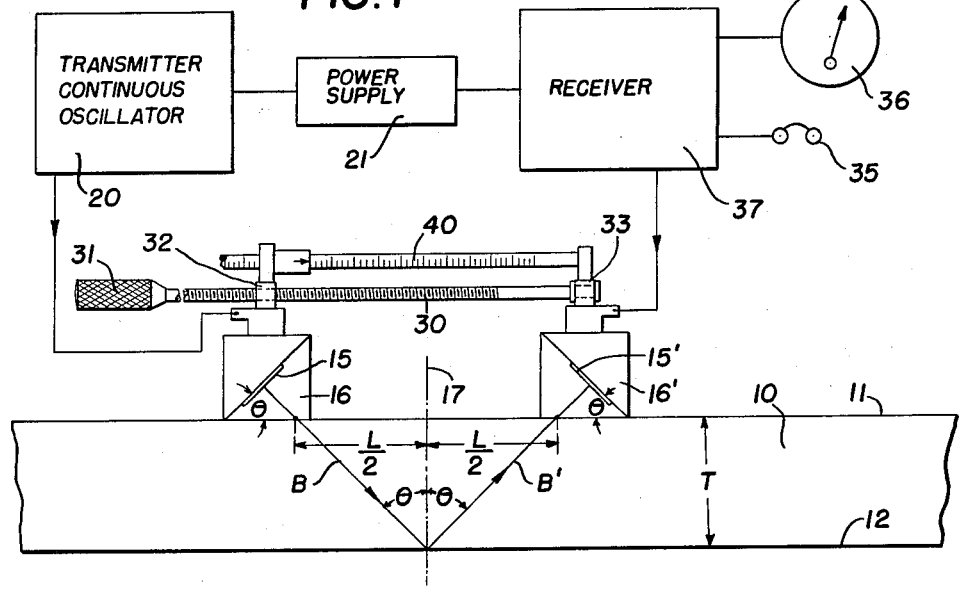
Fig. 1 is a side elevation, partly diagrammatic, of one form of my invention applied to an object whose thickness is to be measured.

Referring to Fig. 1 of the drawings, there is shown an object 10 having opposed surfaces 11 and 12, which object is to be measured for thickness by my invention. For this purpose there is provided an electro-acoustic transducer which may take the form of a quartz crystal 15 mounted on a support 16 at an angle to surface 11 so that vibrations of said crystal will be transmitted into the object in the form of a beam B at an angle of inclination $\theta$ to the normal axis 17. For vibrating the crystal 15 continuously at ultrasonic frequency, the crystal may be electrically connected to any suitable continuous oscillator transmitter 20 energized from a power supply 21, so that crystal 15 will be continuously vibrated at a predetermined ultrasonic frequency.

The ultrasonic beam B thus transmitted into object 10 through surface 11 at an angle of inclination $\theta$ will strike surface 12 at an angle of incidence $\theta$ and will be reflected from said surface at an equal angle of reflection $\theta$. If a second quartz crystal 15' is mounted on a support 16' inclined at the same angle $\theta$ as the crystal 15 but in the opposite direction, it will be apparent that crystal 15' will receive the maximum amount of reflected energy when it is normal to the reflected beam B'. At this point of maximum reception, the distance between the two points where the beam enters and leaves the objects is L. Since $$\frac{L}{2T} = \tan \theta$$

$$T = \frac{L}{2 \tan \theta}$$

2 tan $\theta$ being a constant, $$T = kL$$

In other words, the distance L, and therefore the distance between the crystals 15 and 15', is a function of the thickness of the object, and a scale indicating the distance L can be calibrated directly in terms of thickness of the object.

To facilitate the operation of the device and the direct reading of thickness, the two crystal supports may be mounted for relative movement. Thus, a screw 30 operated by knuled knob 31 may have threaded relation with a lug 32 on support 16 and be swivelly mounted in a lug 33 on support 16' whereby turning of knob 31 in one direction or the other will move supports 16 and 16', together with their crystals 15 and 15', closer together or further apart. The operator will move said supports relatively until crystal 15' receives the maximum reflected energy. This condition may be indicated by any of several known devices, such as ear-phones 35 or meter 36, or both as shown, said devices being operated by the signal from transducer 15' after being amplified by a suitable amplifier 37.

Figure 2:
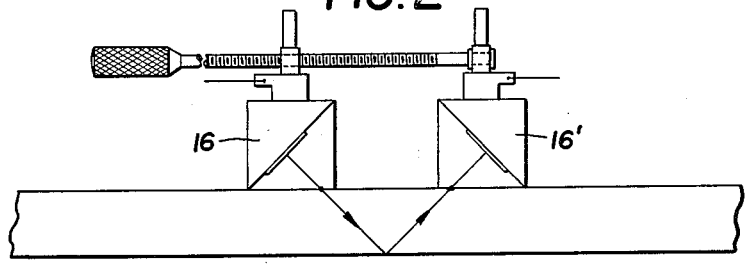
Fig. 2 is a view similar to Fig. 1, with parts omitted, illustrating the parts in a different operating setting.

To permit a direct reading of thickness there may be provided a calibrated rod 40 fixed at one end to one of the lugs (here shown as lug 33 carried by support 16') and slidable through the other lug (here shown as lug 32 carried by support 16). The calibration of rod 40 is in accordance with the hereinbefore mentioned formula $T = kL$, so that the thickness may be read directly as soon as the point of maximum reflected energy has been established. As shown in Fig. 2, a thinner object will cause the supports 16 and 16' to be moved closer together than in Fig. 1 where the object is relatively thicker.

Figure 3:
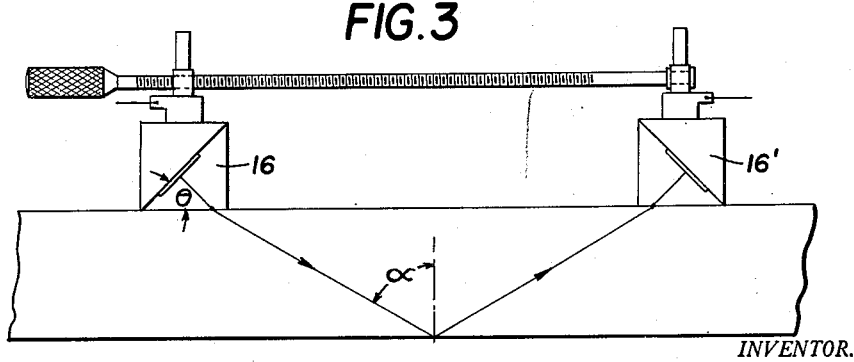
Fig. 3 is a view similar to Figs. 1 and 2 illustrating a modified form of the invention.

In Figs. 1 and 2 it has been assumed that the acoustic impedance of the material of which supports 16 and 16' are composed is the same as the acoustic impedance of the material under inspection. Therefore, no refraction of the incident and reflected beams is shown. However, if the acoustic impedance of the supports differs from that of the inspected material, there will be refraction, as shown in Fig. 3, where the angle of incidence within the object is $a$ whereas the angle of inclination of the crystal with respect to surface 11 remains $\theta$. This will affect the angles of incidence and refraction and will change the value of $k$ in the formula $T=kL$, and thus will affect the calibration of ruled rod 40.

Having described my invention, what I claim and desire to secure by Letters Patent is:

1. A device for determining thickness of an object having opposed surfaces, comprising electro-acoustic transducer means cooperating with one surface of said object for transmitting ultrasonic vibrations into the object through said surface at an angle to normal, a source of electric oscillations of ultrasonic frequency connected to said transducer, electro-acoustic transducer means cooperating with said first surface for receiving the vibrations after reflection from the opposite surface of the object, means connected to said receiving means and responsive to the energy received by said receiving means, means for moving said receiving means relative to said transmitting means along said first surface to locate the point of maximum energy reception, said distance between said transmitting means and said receiving means at said point of maximum energy reception being a function of the thickness of the object, and means for indicating the distance between said transmitting and said receiving means.

2. A device for determining thickness of an object having opposed surfaces, comprising electro-acoustic transducer means cooperating with one surface of said object for transmitting ultrasonic vibrations into the object through said surface at an angle to normal, a source of electric oscillations of ultrasonic frequency connected to said transducer, electro-acoustic transducer means cooperating with said first surface for receiving the vibrations after reflection from the opposite surface of the object, means connected to said receiving means and responsive to the energy received by said receiving means, means for moving said receiving means relative to said transmitting means along said first surface to locate the point of maximum energy reception, said distance between said transmitting means and said receiving means at said point of maximum energy reception being a function of the thickness of the object, and means fixed to one of said transducer means and movable with respect to said other transducer means for indicating the distance between said transmitting and said receiving means.

3. A device for determining thickness of an object having opposed surfaces, comprising electro-acoustic transducer means cooperating with one surface of said object for transmitting ultrasonic vibrations into the object through said surface at an angle to normal, a source of electric oscillations of ultrasonic frequency connected to said transducer, electro-acoustic transducer means cooperating with said first surface for receiving the vibrations after reflection from the opposite surface of the object, means connected to said receiving means and responsive to the energy received by said receiving means, means for moving said receiving means relative to said transmitting means along said first surface to locate the point of maximum energy reception, said distance between said transmitting means and said receiving means at said point of maximum energy reception being a function of the thickness of the object, and means fixed to one of said transducer means and movable with respect to said other transducer means for indicating the distance between said transmitting and said receiving means, said last-named means being calibrated in units of thickness.

FRANK E. PRINGLE, Jr.

References Cited in the file of this patent

UNITED STATES PATENTS

| Number | Name | Date |
| --- | --- | --- |
| 2,439,130 | Firestone | Apr. 6, 1948 |

FOREIGN PATENTS

| Number | Country | Date |
| --- | --- | --- |
| 564,513 | Great Britain | Oct. 2, 1944 |